United States Patent [19]

Nagatomo

[11] Patent Number: 4,998,324
[45] Date of Patent: Mar. 12, 1991

[54] ANIMAL INTESTINE INCISING APPARATUS

[75] Inventor: Toshihiro Nagatomo, Miyazaki, Japan

[73] Assignee: Seicon Co., Ltd., Miyazaki, Japan

[21] Appl. No.: 485,463

[22] Filed: Feb. 27, 1990

[51] Int. Cl.⁵ ............................................. A22C 17/16
[52] U.S. Cl. ................................................... 452/149
[58] Field of Search ........................... 17/43, 52, 50, 21

[56] References Cited

U.S. PATENT DOCUMENTS

| | | | |
|---|---|---|---|
| 2,697,245 | 12/1954 | Clemens et al. | 17/43 |
| 2,701,386 | 2/1955 | Strickler | 17/43 |
| 3,290,722 | 12/1966 | Norks | 17/43 |
| 3,509,593 | 5/1970 | Moss | 17/43 |
| 4,063,331 | 12/1977 | O'Neal et al. | 17/43 |

FOREIGN PATENT DOCUMENTS 548769 11/1957 Canada .................................. 17/43
125537 5/1989 Japan .

*Primary Examiner*—Willis Little
*Attorney, Agent, or Firm*—Morrison Law Firm

[57] ABSTRACT

An apparatus for incising animal's intestines comprises a guide rod to be inserted into animal's intestines for guiding the intestines backward, a pair of endless belts disposed along both longitudinal sides of the guide rod for transporting the intestines backward, an incising blade disposed above and a cutting blade disposed below the guide rod respectively for longitudinally incising an upper side of the intestines and cutting to remove a fat layer deposited on a lower surface of them, and a cleaning means disposed downstream to the guide rod for cleaning the incised intestines. A take-drum may preferably be disposed downstream to the cleaning means. Incising treatment for animal's intestines can be automated completely.

9 Claims, 5 Drawing Sheets

ANIMAL INTESTINE INCISING APPARATUS

BACKGROUND OF THE INVENTION

1. Field of the Invention

The present invention concerns an apparatus for automatically and continuously incising tubular organs such as intestines removed from animals such as pigs and cows.

2. Description of the Prior Art

Beef and pork intestines are cut into pieces and used as materials of foods such as oriental-style grills and skewered meats. As pre-treatment before cooking such foods, the contents of the intestines and fat layer deposited on the surface thereof must be removed.

Such pre-treatment is conventionally done by hand, but there is a demand for automated continuous processing of intestines because it is a troublesome and insanitary job.

The present inventor has previously disclosed an apparatus for incising intestines in Japanese Patent Publication Hei 1-25537. This apparatus comprises a guide rod for inserting into intestines and guiding them, a pair of endless belts disposed on both lateral sides of the guide rod for backwardly transporting the intestines put over the guide rod, an incising blade disposed above the guide rod for incising the intestines longitudinally, and a rotary cutting blade disposed below the guide rod for cutting so as to remove the fat layer deposited on the outer surface of the intestines.

In this apparatus, a coil of intestines is loosen, and the leading end is put over the top end of the guide rod and is transported backward along with the rotation of a pair of endless belts which are in frictional contact with the intestines on both sides of the guide rod.

In the course of the transportation, the intestines are incised longitudinally by the rotation of the incising blade at the upper portion thereof and, simultaneously, the fat layer deposited on the underside of the intestines is cut and removed by the cutting blade.

It is thus possible to treat animal's intestines automatically and continuously by this apparatus.

However, when the apparatus was put to practical use, several practical problems were found to need solving.

Since the intestines after the incision are difficult to handle, being slimy and dirty, appropriate subsequent treatments are also required Moreover, the diameter and thickness of animals' intestines differ on the kind of animal. If the thickness of the intestines is too large, it is difficult to seize the intestines between a pair of belts. On the other hand, if the thickness is too small, the belts and the surface of the intestines cannot come into close contact with each other, and transportation is difficult or even impossible.

Further, the fat layer deposited on the lower portion of the intestines cannot be removed uniformly by the rotary cutting blade.

OBJECT OF THE INVENTION

It is, accordingly, an object of the present invention to provide an animal intestine incising apparatus capable of processing intestines completely automatically and continuously through a series of consecutive steps, including post-treatment after the incision.

Another object of the present invention is to provide an animal intestine incising apparatus capable of efficiently treating intestines, irrespective of any variation in the shapes and states thereof.

SUMMARY OF THE INVENTION

The first aspect of the present invention for attaining the foregoing objects resides in:

an apparatus for incising animal's intestines comprising:

a guide means to be inserted at a top end into animal's intestines for guiding the intestines backward along a circumferential surface of the means, a pair of rotary transportation means disposed along both longitudinal sides of the guide means for seizing and backwardly transporting the intestines, an incising means disposed above and spaced apart from the circumferential surface of the guide means for longitudinally incising the upper surface of the intestines when they are transported backward, a cutting means disposed below and spaced apart from the guide means for cutting to remove a fat layer deposited on the lower surface of the intestines, a cleaning means disposed downstream to the guide means for cleaning the intestines after incision and removal of the fat layer, the leaning means comprising at least one rotary brushing means and at least one water spray means each disposed along and above a path way of the intestines transported from the guide means.

The second aspect of the present invention resides in:

an apparatus for incising animal's intestines comprising:

a guide means to be inserted at a top end into animal's intestines for guiding the intestines backward along a circumferential surface of the means, a pair of rotary transportation means disposed along both longitudinal sides of the guide means for seizing and backwardly transporting the intestines, an incising means disposed above and spaced apart from the circumferential surface of the guide means for longitudinally incising the upper surface of the intestines when they are transported backward, a cutting means disposed below and spaced apart from the guide means for cutting to remove a fat layer deposited on the lower surface of the intestines, a rotary take-up means disposed downstream to the incising means and rotationally driven from a driving power source for taking-up the intestines around the take-up means by rotation, the take-up means having a clutch means capable of automatically disconnecting transmission of a driving power from the driving power source to the take-up means when an extraordinary external load is applied to the take-up means.

The third aspect of the present invention resides in:

an apparatus for incising animal's intestines comprising:

a guide means to be inserted at a top end into animal's intestines for guiding the intestines backward along a circumferential surface of the means, a pair of rotary transportation means disposed along both longitudinal sides of the guide means for seizing and backwardly transporting the intestines, an incising means disposed above and spaced apart from the circumferential surface of the guide means for longitudinally incising the upper surface of the intestines as when they are transported backward, a cutting means disposed below and spaced apart from the guide means for cutting to remove a fat layer deposited on the lower surface of the intestines, said cutting means having a means for adjusting a gap between said cutting means and said guide means, a cleaning means disposed downstream to the guide means for cleaning the intestines after incision and removal of the fat layer, the cleaning means comprising at least one rotary brushing means and at least one water spray means each disposed along and above a path way of the intestines transported from the guide means, a rotary take-up means disposed downstream to the cleaning means and rotationally driven from a driving power source for taking-up the cleaned intestines around the take-up means by rotation, the take-up means having a clutch means capable of automatically disconnecting transmission of a driving power from the driving power source to the take-up means when an extraordinary external load is applied to the take-up means.

The guide means may preferably comprise a guide rod of a substantially circular cross section and having a laterally extending flat portion near the top end thereof.

The rotary transportation means may preferably comprise a pair of endless belts for seizing the intestines therebetween in frictional contact.

A pair of endless belts may be biased such that they approach closer to each other by a tension spring disposed therebetween.

The cutting means may preferably comprise a rotary blade rotatable around a vertical shaft, the height of which is made adjustable.

The cleaning means may preferably comprises a plurality of rotary brushes and a plurality of water spray nozzles.

The take-up means may preferably comprise a take-up drum rotatable around a vertical axis, a vertical driving shaft and a slip clutch mechanism disposed therebetween.

DESCRIPTION OF THE ACCOMPANYING DRAWINGS

These and other objects, as well as advantageous features, of the present invention will be described below with reference to a preferred embodiment thereof in conjunction with the accompanying drawings, wherein FIG. 1 is a schematic perspective view of a prior-art apparatus for incising animal intestines;

DESCRIPTION OF THE PREFERRED EMBODIMENT OF THE INVENTION

Before describing the present invention, the constitution and operation of a prior-art apparatus for incising animal intestines, as disclosed in Japanese Patent Publication Hei 1-25537, will be outlined.

Figure 1:
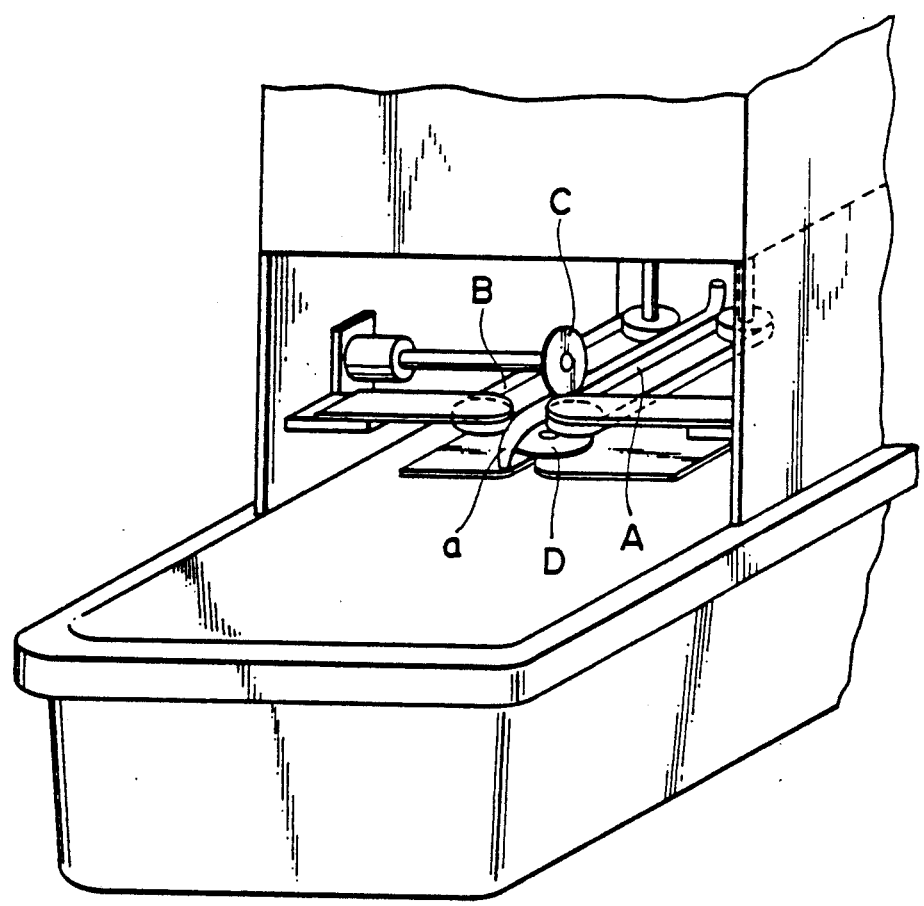

As shown in the perspective view of FIG. 1, the apparatus of the prior art comprises a guide rod A of a circular cross-section having a hook-like top end a over which one end of an animal's intestines is to be put, a pair of endless conveyor belts B disposed along the longitudinal sides of the guide rod A for backwardly transporting by the rotation thereof the intestines put over the outer circumferential surface of the guide rod A, a rotary incising blade C disposed above the guide rod A with a small gap therebetween for incising the intestines longitudinally as they are transported backward, and a rotary cutting blade D disposed below and spaced apart from the lower side of the guide rod A for cutting and removing a fat layer deposited on the underside of the intestines put over the outer circumferential surface of the guide rod A.

When a coil of animal intestines (not illustrated) is released from its coiled state and the top end thereof is put over the top end a of the guide rod A, the intestines are transported backward in close contact with the pair of endless conveyor belts B continuously along with the rotation of the belt. In the course of the transportation, the fat layer deposited on the underside of the intestines is cut and removed by the rotary cutting blade D rotating in a horizontal plane, while the upper side of the intestines is incised longitudinally by the rotary incising blade C rotating in a vertical plane.

In this apparatus, the pair of endless conveyor belts B are each disposed adjacent to the circumferential surface of the guide rod A, with a small gap therebetween corresponding to the average wall thickness of intestines, so that the intestines can be transported by the frictional engagement with the belts B.

However, the diameter and wall thickness of animals' intestines differ with individual animals. Therefore, if the wall thickness of the intestines is too large it will sometimes be difficult for the intestines to be firmly seized between the surface of each belt B and the surface of the guide rod A, and hence smooth transportation of the intestines is difficult.

On the other hand, if the wall thickness of the intestines is too small, the pair of belts B cannot come into close contact with the outer surface of the intestines, thus sometimes failing to transport the intestines.

In addition, since the thickness of the fat layer deposited on the circumferential surface of the tubular intestines varies, the fat cannot always be removed uniformly by the rotation of the rotary cutting blade D.

In addition, since the intestines after being incised and having the fat layer removed are slimy and dirt, they pollute the working environment and make the subsequent handling of the intestines troublesome and insanitary.

A description will now be made of a preferred embodiment of an apparatus for incising animal intestines according to the present invention, intended to solve such problems in the prior art.

FIGS. 2 through 5 show a preferred embodiment of the apparatus of the present invention.

Figure 2:
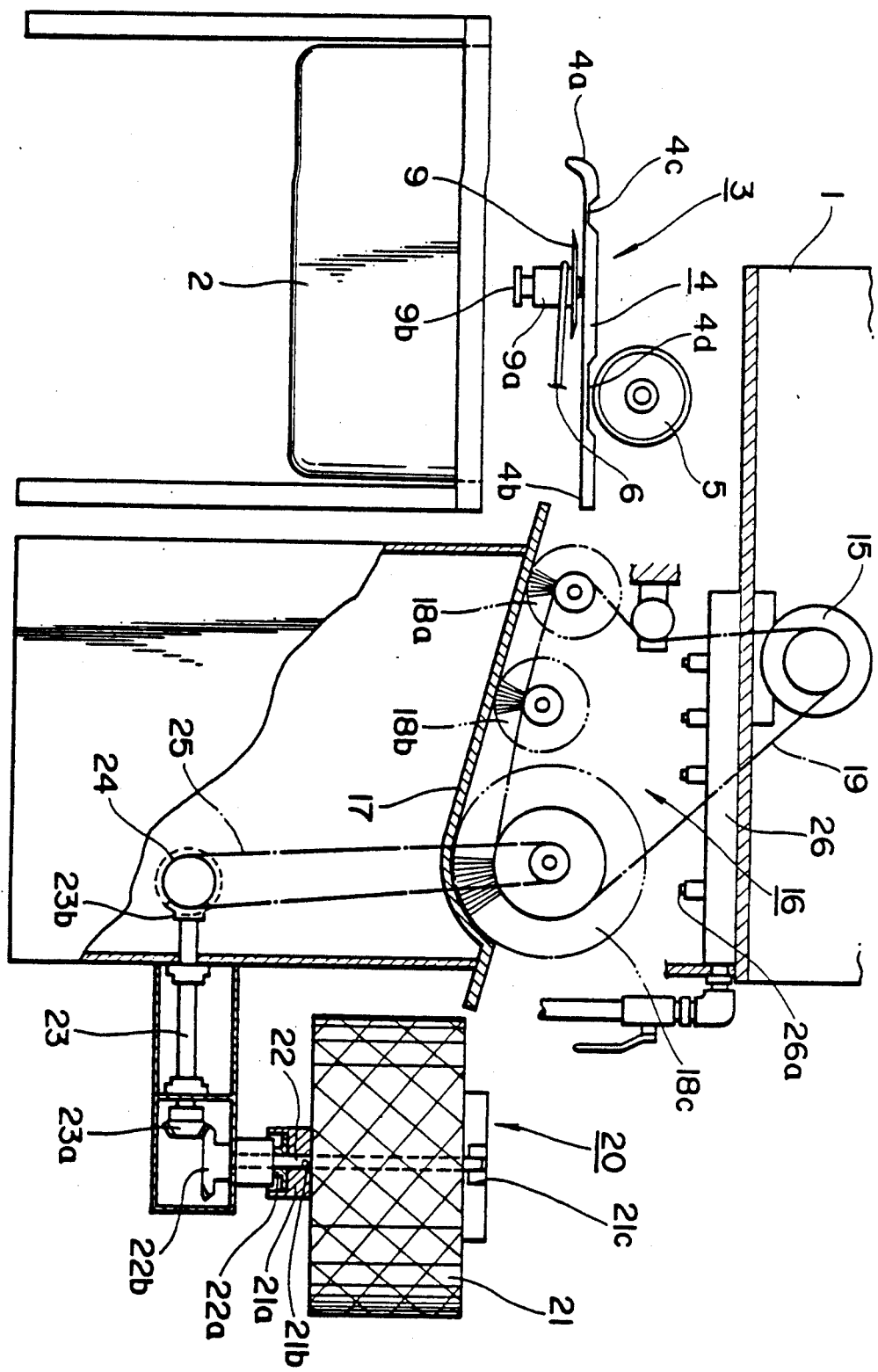
FIG. 2 is a side elevational view of one embodiment of an apparatus for incising animal intestines according to the present invention.

As shown in FIG. 2, the apparatus of this embodiment comprises an apparatus main body 1, with a water tub 2 disposed therebelow into which the animal intestines to be incised are stored. An incising station 3 is disposed above the water tub 2 and comprises a round guide rod 4, along the outer circumferential surface of which the animal intestines to be incised are put longitudinally, a pair of endless conveyor belts 12 disposed on both lateral sides of the guide rod 4 for seizing and backwardly transporting the intestines (also refer to FIGS. 3 and 4), a rotary incising blade 5 disposed above the circumferential surface of the guide rod 4, with a small gap therebetween, for longitudinally incising the intestines put thereover, and a rotary cutting blade 9 disposed below and spaced apart from the guide rod 4 for cutting and removing a fat layer deposited on the circumferential surface of the intestines put over the guide rod 4.

The rotary incising blade 5 disposed above the guide rod 4 is directly coupled with a drive motor 14 secured to the apparatus main body 1 (refer to FIG. 4) so that it can rotate within a vertical plane. A rotational shaft 9a of the rotary cutting blade 9 is connected by way of a belt 6 to a drive motor, not illustrated, so that the blade 9 can rotate within a horizontal plane slightly spaced apart from the lower side of the guide rod 4. An adjusting screw 9b is disposed on the rotational shaft 9a so that the blade 9 can be displaced vertically by an operation performed on the shaft 9a to control the distance between the blade 9 and the lower side of the intestines put over the outer circumference surface of the guide rod 4.

As further shown in FIG. 3 and FIG. 4, the guide rod 4 has a hook-like top end 4a and a rear end 4b that extends as far as a cleaning station 16 to be described later.

A recess 4d is formed in the upper side of the guide rod 4 at a position just below the incising blade 5 and in such a manner that the blade 5 does not come into direct contact with the guide rod 4 as it cuts.

A flat portion 4c is formed in the guide rod 4 between the top end 4a and a position corresponding to the tip of the blade 9. The flat portion 4c extends laterally in such a manner that the animal intestines put over the top end 4a of the guide rod 4 are extended to the sides, so that the fat layer deposited on the intestines is also deformed flat in this portion 4c.

Figure 3:
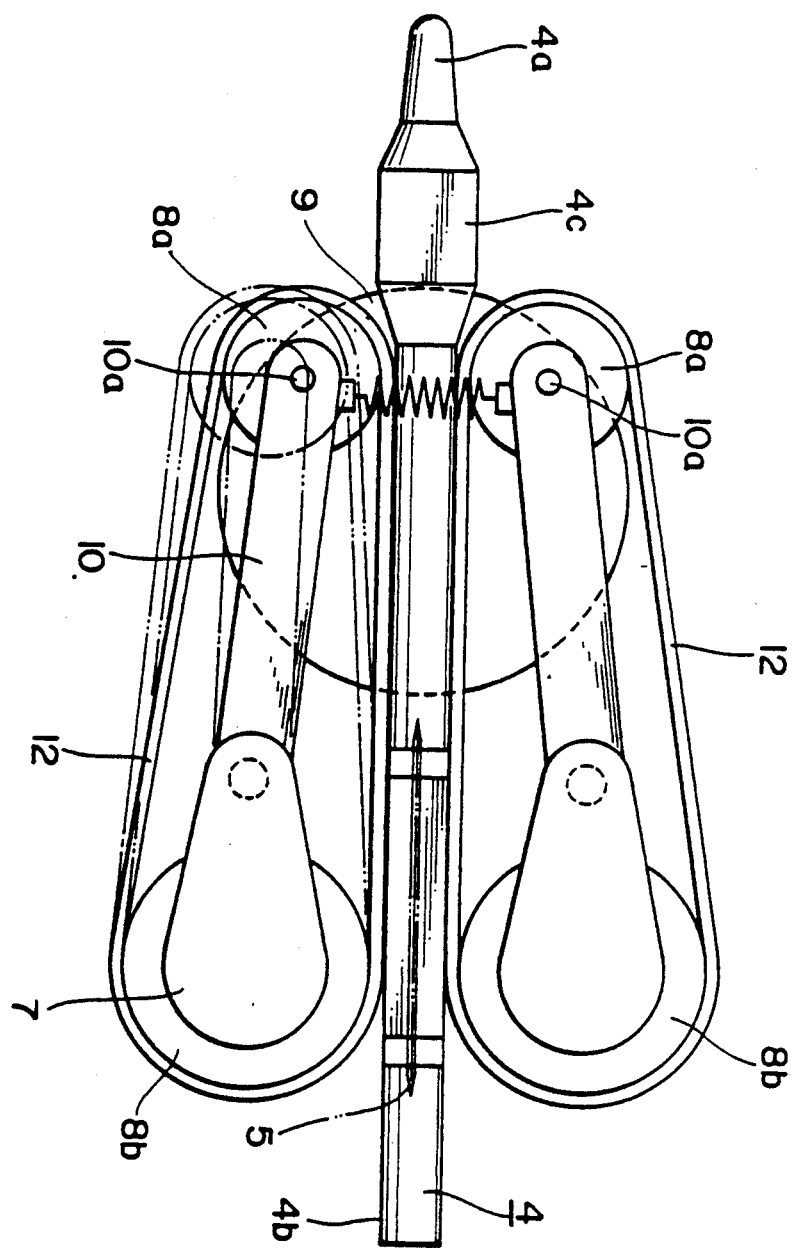
FIG. 3 is a plan view of a guide rod in conjunction with transportation means.
Figure 4:
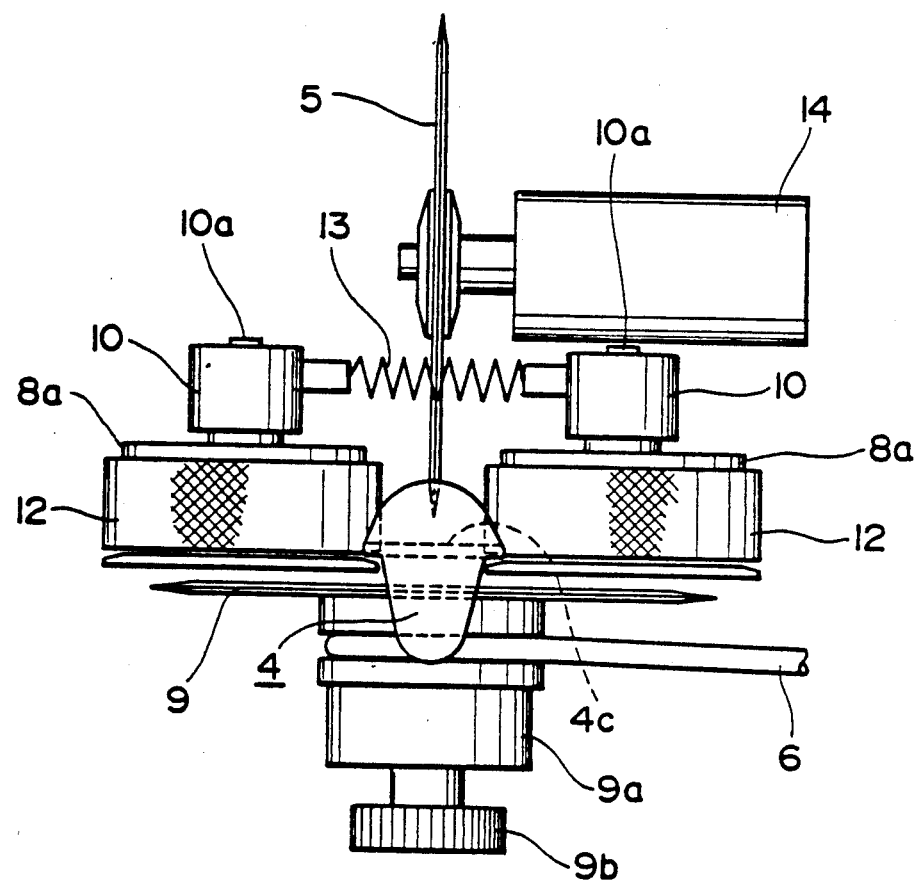
FIG. 4 is a front elevational view of a portion of the apparatus shown in FIG. 2.
Figure 5:
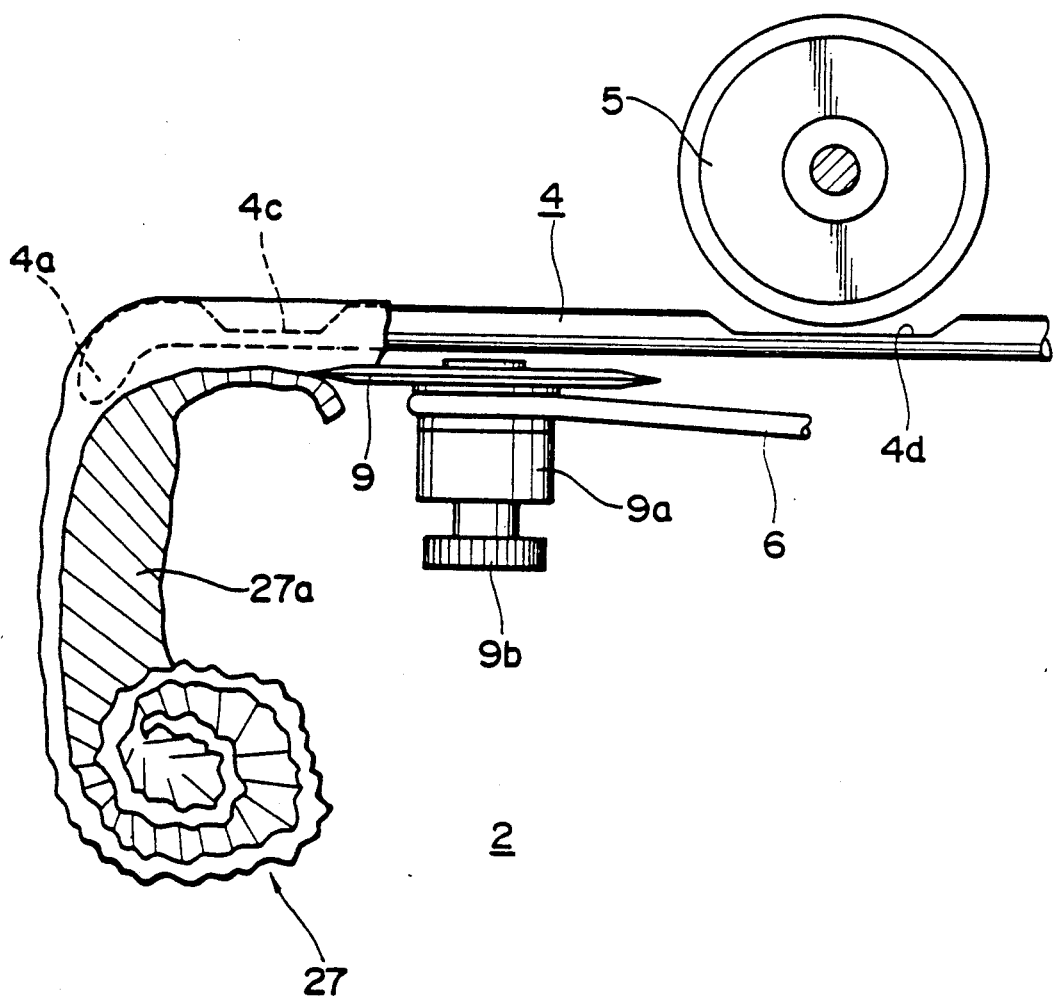
FIG. 5 is a schematic side elevational view illustrating a state in which animal intestines are put over the guide rod shown in FIGS. 2 and 3.

As also shown in FIGS. 3 and 4, each of the pair of endless belts 12 is rotatably stretched around a pair of rotary cylinders 8a and 8b disposed near the top end 4a and the rear end 4b of the guide rod 4, respectively. The lower end of a rotational shaft for each rotary cylinder 8b is directly coupled with a drive motor, not shown. Further, a fixed arm 7 is supported on the upper end of a rotational shaft for each rotary cylinder 8b. Each rotary cylinder 8a is rotatably supported at the top end of a swing lever 10 which is pivoted at the top end of the corresponding fixed arm 7. The pair of swing levers 10 are resiliently biased in directions towards each other by a tension spring 13.

Therefore, the pair of endless belts 12 are always forced into close contact with the lateral sides of the intestines put over the outer circumferential surface of the guide rod 4, and they are able to move away from each other against the resiliency of the spring 13 to allow intestines of a larger wall thickness to be seized between the belts 12.

As shown in FIG. 2, a cleaning station 16 is disposed contiguous with and downstream of the incising station 3.

The cleaning station 16 comprises a cleaning stand 17 disposed adjacent to the rear end 4b of the guide rod 4, three rotational brush rolls 18a, 18b, and 18c arranged successively just above and along the path of intestines on the cleaning stand 17, and a water feed pipe 26 disposed above the cleaning stand 17 and equipped with a plurality of spray nozzles 26a.

The rotary brush rolls 18a, 18, and 18c are all connected by way of a chain 19 to a driving motor 15 disposed on the upper portion of the apparatus main body 1.

Downstream of the cleaning station 16, a take-up device 20 is disposed The take-up device 20 comprises a rotational take-up drum 21 and a driving mechanism for rotationally driving the take-up drum 21. The driving mechanism comprises a vertical driving shaft 22 disposed vertically on the apparatus main body 1 and a horizontal driving shaft 23 connected by means of bevel gears 22b and 23a to the vertical driving shaft 22. The horizontal driving shaft 23 is connected by way of bevel gears 24 and 23b and a driving chain 25 to the rotational shaft of the brush roll 18c. In this way, the driving power of the drive motor 15 is transmitted by way of the brush roll 18c, the chain 25, and the bevel gears 24 and 23b to the horizontal driving shaft 23 and, further, by way of the bevel gears 23a and 22b to the vertical driving shaft 22.

A seat plate 22a is secured to the vertical driving shaft 22, while a clutch plate 21a is secured to the axial center at the bottom of the take-up drum 21 with a central hole 21b perforated through the clutch plate 21a.

The take-up drum 21 is mounted on the vertical driving shaft 22 by inserting the shaft 22 into the hole 21b in the clutch plate 21a and then supporting the upper end of the shaft 22 by the bearing 21c disposed at the top of the take-up drum 21. In the state in which the take-up drum 21 is mounted to the vertical driving shaft 22, the clutch plate 21a integrated with the take-up drum 21 is in a frictional contact with the seat plate 22 integrated with the vertical driving shaft 22.

In this embodiment, the seat plate 22a and the clutch plate 21a are usually engaged to each other under an appropriate frictional force, so that the take-up drum 21 and the vertical driving shaft 22 may be coupled together and rotated integrally. However, when such an extraordinary external force as inhibiting the rotation of the take-up drum 21 is exerted from the side of the intestines to the drum 21, the clutch plate 21a comes to slide on the seat plate 22a overcoming the frictional force, to disengage the clutch mechanism, in which only the vertical driving shaft 22 rotates idly while leaving the take-up drum 21 stationary as it is.

OPERATION OF THE EMBODIMENT

The operation of the embodiment being thus constituted will be described.

At first, animal's intestines stored in the water tub 2 are released from the coiled state and the leading end thereof are put over the top end 4a of the guide rod 4 (refer to FIG. 4). Then, the intestines 27 are extended laterally at the flat portion 4c of the guide rod 4 (refer to FIGS. 2 and 3) and, as a result, a fat layer 27a deposited to the underside of the intestines 27 is also extended laterally.

Then the intestines 27 put over the outer circumferential surface of the guide rod 4 are placed between and in close contact with the pair of endless belts 12 disposed on both lateral sides of the guide rod 4, and are then transported backward along the guide rod 4 (rightward in FIGS. 2 and 3).

In this case, since at least one of the rotational cylinders 8a is enabled to move away from and approach closer to the guide rod 4 by means of the swing levers 10 under the biasing force of the tension spring 13, the pair of belts 12 laid respectively over the cylindrical rods 8a are also enabled to move away from and approach closer to the outer circumferential surface of the intestines 27 put over the guide rod 4. When the guide rod 4 is inserted into the intestines, one set of swing lever 10, cylinder 8a, etc., is caused to swing against the resiliency of the tension spring 13 to the position shown by the broken line in FIG. 3 by operating, for example, a rotational knob 10a attached to the swing lever 10.

Since this forms a large gap between the top end (left end in FIG. 3) of the belt 10 and the guide rod 4, even intestines of a large thickness can easily be put over the top end of the guide rod 4 and transported smoothly.

On the other hand, if the thickness of the intestines 27 is small, since the belt 12 can be urged toward the outer surface of the intestines 27 by the resiliency of the tension spring 13, the intestines can be transported reliably in close contact with the belts 12.

In this respect, if the rotational range of the cylinder 4a is made sufficiently larger, it will also be possible to easily clean the guide rod 4, belt 12, etc., which tend to become contaminated during the incising operation.

Although only one of the pair of rotational cylinders 8a is made moveable herein, it is possible to adapt them so that both of the cylinders 8a are moveable.

In the course of the backward transportation of the intestines 27, the fat layer 27a deposited on the under surface of the intestines 27 is cut and removed by the rotary cutting blade 9 disposed below the guide rod 4. In this case, since the intestines 27 are extended laterally by the flat portion 4c of the guide rod 4 and the fat layer 27a deposited on the underside thereof is also made flat, it can be cut and removed uniformly by the cutting blade 9 disposed below the guide rod 4, by adjusting the vertical distance between the cutting blade 9 and the guide rod 4 as appropriate by a operation to the adjusting screw 9b for the rotational shaft 9a (refer to FIG. 4).

The intestines 27 that have had the fat layer 27a removed in this way are then continuously incised longitudinally by the rotation of the incising blade 5 disposed above the guide rod 4.

Then the intestines 27 that have had the fat layer 27a removed and have been incised are transported from the shown in FIG. 2.

The intestines thus transferred to the cleaning station 16 are cleaned by being sent through a path (not shown) below the three rotating brushing rolls 18a, 18b, and 18c which are sequentially arranged on the cleaning stand 17 along the transportation path of the intestines (not shown) and are rotated in the counterclockwise direction, and are further cleaned by means of cleaning water sprayed from above by the plurality of spray nozzles 26a disposed in the water feed pipe 26, to thoroughly wash out the dirty contents of the intestines.

Finally, the thus cleaned intestines are wound around the take-up roll 21 in the take-up roll device 20 disposed downstream of the cleaning station 16, by which all the processing steps are completed.

In this case, since the intestines 27 are transported by the rotation of the pair of endless belts 12, the take-up drum 21 only serves to take up the thus transported intestines 27 therearound with no slackening.

Since the slipping clutch mechanism comprising the clutch plate 21a and the seat plate 22a is disposed between the take-up drum 21 and the vertical driving shaft 22 provided for the rotation thereof, if an extraordinary large external force is applied to the take-up drum 21, to hinder the rotation thereof, the clutch mechanism is disengaged and only the vertical driving shaft 22 rotates idly, leaving the drum 21 stationary. Accordingly, in the present embodiment, if the transportation of the intestines is hindered for some reason and the take-up drum 21 can no longer rotate, slippage is caused between the clutch plate 21a of the drum 21 and the seat plate 22a of the vertical driving shaft 22, allowing the take-up drum 21 to stay as it is. This can prevent breaking of the intestines by excessive stretching.

As has been described above, according to the present invention, it is possible to completely automate all of the processing steps of incising an animal's intestines, including incision and fat removal, as well as subsequent steps of the complete cleaning of the intestines and the final arrangement thereof into a form suitable for shipping.

Further, it is also possible to efficiently handle various intestines of different shapes and states, and reliably treat the intestines with no worry of their breaking.

What is claimed is:

1. An apparatus for incising animal's intestines comprising:
   a guide means to be inserted at a top end into animal's intestines for guiding said intestines backward along a circumferential surface of said means,
   a pair of rotary transportation means disposed along both longitudinal sides of said guide means for seizing and backwardly transporting the intestines,
   an incising means disposed above and spaced apart from the circumferential surface of said guide means for longitudinally incising an upper surface of said intestines when they are transported backward,
   a cutting means disposed below and spaced apart from said guide means for cutting to remove a fat layer deposited on a lower surface of said intestines,
   a cleaning means disposed downstream to said guide means for cleaning the intestines after incision and removal of said fat layer, said cleaning means comprising at least one rotary brushing means and at least one water spray means each disposed along and above a path way of the intestines transported from said guide means.

2. An apparatus as defined in claim 1, wherein the guide means is laterally extended and flattered at a portion between the top end and the cutting means.

3. An apparatus as defined in claim 1, wherein a pair of rotary transmission means comprise a means for adjusting a lateral gap therebetween through which the intestines are passed.

4. An apparatus for incising animals's intestines comprising:
   a guide means to be inserted at a top end into animal's intestines for guiding said intestines backward along a circumferential surface of said means,
   a pair of rotary transportation means disposed along both longitudinal sides of said guide means for seizing and backwardly transporting said intestines
   an incising means disposed above and spaced apart from the circumferential surface of said guide means for longitudinally incising an upper surface of said intestines when they are transported backward, a cutting means disposed below and spaced apart from said guide means for cutting to remove a fat layer deposited on a lower surface of said intestines a rotary take-up means disposed downstream to said incising means and rotationally driven from a driving power source for taking-up the intestines around said take-up means by rotation, said take-up means having a clutch means capable of automatically disconnecting transmission of a driving power from said driving power source said the take-up means when an extraordinary external load is applied to said take-up means.

5. An apparatus as defined in claim 4, wherein the guide means is laterally extended and flattered at a portion between the top end and the cutting means.

6. An apparatus as defined in claim 4, wherein a pair of rotary transmission means comprise a means for adjusting a lateral gap therebetween through which the intestines are passed.

7. An apparatus for incising animal's intestines comprising:

a guide means to be inserted at a top end into animal's intestines for guiding said intestines backward along a circumferential surface of said means, a pair of rotary transportation means disposed along both longitudinal sides of said guide means for seizing and backwardly transporting said intestines, an incising means disposed above and spaced apart from the circumferential surface of said guide means for longitudinally incising an upper surface of said intestines as when they are transported backward, a cutting means disposed below and spaced apart from said guide means for cutting to remove a fat layer deposited on a lower surface of said intestines, said cutting means having a means for adjusting a gap between said cutting means and said guide means, a cleaning means disposed downstream to said guide means for cleaning the intestines after incision and removal of said fat layer, said cleaning means comprising at least one rotary brushing means and at least one water spray means each disposed along and above a path way of the intestines transported from said guide means, a rotary take-up means disposed downstream to said cleaning means and rotationally driven from a driving power source for taking-up the cleaned intestines around said take-up means by rotation, said take-up means having a clutch means capable of automatically disconnecting transmission of a driving power from said driving power source to said take-up means when an extraordinary external load is applied to said take-up means.

8. An apparatus as defined in claim 7, wherein the guide means is laterally extended and flattered at a portion between the top end and the cutting means.

9. An apparatus as defined in claim 7, wherein a pair of rotary transmission means comprise a means for adjusting a lateral gap therebetween through which the intestines are passed.

* * * * *